United States Patent
Gerwig

(10) Patent No.: US 12,036,745 B2
(45) Date of Patent: Jul. 16, 2024

(54) CURRENT COLLECTOR HEAD MANUFACTURING METHOD AND CURRENT COLLECTOR HEAD

(71) Applicant: Conductix-Wampfler GmbH, Weil am Rhein (DE)

(72) Inventor: Max Gerwig, Kandern (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 10 days.

(21) Appl. No.: 17/679,557

(22) Filed: Feb. 24, 2022

(65) Prior Publication Data
US 2022/0274346 A1     Sep. 1, 2022

(30) Foreign Application Priority Data

Feb. 26, 2021   (DE) .................. 10 2021 104 704.8

(51) Int. Cl.
*B29C 65/36*     (2006.01)
*B29C 65/00*     (2006.01)

(52) U.S. Cl.
CPC ........ *B29C 65/362* (2013.01); *B29C 65/3684* (2013.01); *B29C 66/74* (2013.01); *B29C 66/7444* (2013.01)

(58) Field of Classification Search
CPC ............ B29C 65/362; B29C 65/3684; B29C 66/7444; Y02E 60/10; B60L 5/12; B60L 5/38; B60L 2200/26; B60L 55/00; B60L 5/08

See application file for complete search history.

(56) References Cited

U.S. PATENT DOCUMENTS 5,203,437 A     4/1993   Bormann

FOREIGN PATENT DOCUMENTS

| CN | 110027131 A | * | 7/2019 | |
|---|---|---|---|---|
| DE | 38 21 255 A1 | | 12/1989 | |
| DE | 90 04 828 U1 | | 8/1991 | |
| DE | 102014203559 A1 | * | 8/2015 | ............. B29C 65/36 |
| DE | 10 2018 005 878 A1 | | 1/2020 | |

OTHER PUBLICATIONS

Pantograph; https://en.wikipedia.org/wiki/Pantograph_(transport); accessed Aug. 16, 2018 (Year: 2015).*
Result of examination report for German Patent Application No. 10 2021 104 704.8, filed Feb. 26, 2021.

* cited by examiner

*Primary Examiner* — S. Behrooz Ghorishi
(74) *Attorney, Agent, or Firm* — Paul D. Bianco; Fleit Intellectual Property Law

(57) ABSTRACT

A method for manufacturing a current collector head for a current collector consisting of an electrically conductive contact shoe and an electrically insulating contact shoe holder includes the following steps: inserting a section of the contact shoe into an outwardly open cavity in the contact shoe holder dimensioned to match this section; clamping the contact shoe in the cavity of the contact shoe holder by acting on the contact shoe holder with at least an external force directed onto the inserted section of the contact shoe; heating the contact shoe to a temperature sufficient to form a bonded connection with the contact shoe holder; and cooling the current collector head formed from the contact shoe and the contact shoe holder.

14 Claims, 2 Drawing Sheets

CURRENT COLLECTOR HEAD MANUFACTURING METHOD AND CURRENT COLLECTOR HEAD

FIELD OF THE DISCLOSURE

The disclosure concerns a method for manufacturing a current collector head for a current collector, as well as a current collector.

BACKGROUND

Such a current collector head comprises a contact shoe made of electrically conductive material, which is moved during operation of the current collector along a contact line in sliding contact with a live rail, and a contact shoe holder made of electrically insulating material in which the contact shoe is accommodated and which makes a mechanical connection with other components of the current collector, from which the contact shoe must be electrically insulated. Electrical contacting of the contact shoe occurs via a cable that is connected to the contact shoe in the interior of the contact shoe holder by means of a plug connection. If the contact shoe is worn, the current collector head is completely replaced. Use of a current collector head is known in current collectors of conductor rail systems.

In order to keep the contact shoe in sliding contact with the live rail of the contact line, the current shoe holder is acted upon by a spring arrangement of the current collector with a defined force in the direction of the live rail. When the current collector separates from a contact line, as often occurs especially in conductor rail systems in sorting plants, the current collector head is moved by the spring arrangement of the current collector against a mechanical stop as a result of the disappearance of the counteracting force of the live rail, which abruptly stops this movement. This results in the problem that a current shoe inserted into the receptacle of the current shoe holder and secured there by friction can fall out of the receptacle when the inertial force of the contact shoe caused by the stop exceeds the friction force. Such falling out of a contact shoe from the current shoe holder entails failure of the current collector involved and therefore of the entire conductor rail system.

DE 38 21 255 A1 relates to a contact shoe for current collectors with a carbon strip and a support element for supporting the latter, wherein the support element consists of synthetic material, particularly fiber-reinforced and/or foamed synthetic material at least in the cross-sectional area contiguous with the carbon strip. The support element can be connected with the carbon strip, as usual, by gluing, or, preferably, by directly molding the synthetic material onto the carbon strip.

DE 90 04 828 U1 relates to a trolley brush for conductor rails that comprises a base, an arm attached thereto, and a contact support attached to the arm. The base is provided with a slot-like recess, the plane of which lies in the plane that is formed by the longitudinal axis of the arm and a first pivot axis of the arm. The aforementioned recess is delimited by a wall part that has a calotte towards the recess, into which calotte a cambered projection of the arm engages. Between the base part and the arm, a spring is arranged that holds the projection in engagement with the calotte. The arm can thus be pivoted about the pivot axis and in the plane of the recess counter to the spring force.

DE 10 2018 005 878 A1 relates to the use of a multi-layered structure for an element for use as a floor, wall, ceiling, furniture, decoration, interior design element, preferably strip, profile, edge, door and/or window elements, façade, wallpaper, car interior, car exterior and/or outdoor covering elements with at least one biopolymer-containing and/or biopolymer layer and at least one decorative layer.

SUMMARY

One aspect of the disclosure relates to preventing the falling out of the contact shoe from the contact shoe holder during abrupt movements of the current collector head in a current collector head for a current collector.

Accordingly, a current collector head manufacturing method and current collector head are disclosed herein. Advantageous embodiments are also disclosed.

The following steps are prescribed according to an embodiment of the disclosed method for manufacturing a current collector head for a current collector having an electrically conducting contact shoe and an electrically insulating contact shoe holder:

a) inserting a section of the contact shoe into an outwardly open cavity in the contact shoe holder sized to fit this section;

b) clamping the contact shoe in the cavity of the contact shoe holder by acting on the contact shoe holder with at least an external force directed onto the inserted section of the contact shoe;

c) heating the contact shoe to a temperature sufficient to form a bonded connection with the contact shoe holder;

d) cooling the current collector head formed from the contact shoe and the contact shoe holder.

This type of production of a current collector head enjoys decided advantages in comparison with other considered methods. It is less demanding than the production of a shape-mated mechanical connection, for example, in the form of pins, which would be guided by matching transverse holes in the contact shoe and contact shoe holder and fixed there. No additional components are necessary in comparison with such a mechanical connection. It is more reproducible and reliable than an adhesive connection with manual application of the adhesive and less demanding than an adhesive connection with automatic application of the adhesive. The procedure according to the invention also only requires a short time and therefore permits high product throughput.

The action of the external force after completion of heating is expediently maintained for a predetermined time sufficient for permanent stabilization of the bonded connection. This time, as well as the time required during heating to reach the sufficient temperature, can be easily determined experimentally.

Heating of the contact shoe preferably occurs inductively by the action of an alternating magnetic field. This type of heating takes advantage of the fact that the contact shoe has high electrical conductivity due to its function and permits rapid heating without mechanical contact of the contact shoe. Heating of the contact shoe, however, can also occur in other ways, such as mechanical contact with at least one heated body.

The cavity in the contact shoe holder preferably has the shape of a groove with two parallel longitudinal sides, the length of which is a multiple of their spacing and the main direction of the external force directed onto the contact shoe runs perpendicular to the longitudinal sides of the groove. In this way a large surface is available for production of the bonded connection between the contact shoe and the contact shoe holder.

Exposure of the contact shoe holder to the external force directed onto the contact shoe preferably occurs at one or more individual sites along the contact shoe holder. During inductive heating of the contact shoe, better heat transfer to the contact shoe holder occurs at these sites and consequently more rapid softening of the contact shoe holder consisting of synthetic material than away from these sites, so that the formation of a bonded connection is particularly favored at these sites. A configuration comparable to spot welding therefore exists at these sites. Alternatively, exposure of the contact shoe holder to the external force directed onto the contact shoe, however, can also occur extensively along the entire groove of the contact shoe holder, if a uniform bond along the entire length of the groove is to be produced.

Heating of the contact shoe preferably occurs on a section of the contact shoe that protrudes from the groove in the contact shoe holder. In this way, the power for heating is coupled in away from the area in which clamping of the contact shoe in the contact shoe holder occurs, so that no clamping jaws interfere with the components provided for coupling in the power. Consequently, during inductive heating, a small distance is possible between the electromagnetic induction device and the contact shoe, which ensures high efficiency of the power coupling. During heating by mechanical contact with a heated body, this can be brought without hindrance to the section of the contact shoe to be contacted.

Heating of the contact shoe preferably occurs at one or more individual sites along the groove of the contact shoe holder. This permits a targeted local concentration of power coupling to optimize the joining process. Alternatively, if a uniform bonding along the entire length of the groove is to be produced, heating of the contact shoe can also occur extensively along the entire groove of the contact shoe holder.

Both exposure of the contact shoe holder to the external force directed onto the contact shoe and heating of the contact shoe at an identical site or at several identical individual sites along the groove of the contact shoe holder preferably occur. A bonded connection is therefore promoted at one or more predetermined sites and power is coupled in precisely where it is required for the joining process. The overall energy coupled in can therefore be minimized, which favors rapid cooling after the end of heating and ensures a short duration of the joining process.

Heating of the contact shoe in step c) of the method to a temperature sufficient to produce a bonded connection with the contact shoe holder can occur specifically in that the contact shoe is heated to a temperature sufficient to form a bonded connection between the surfaces of the contact shoe holder and the contact shoe forced together by the clamping force.

A further feature disclosed is a current collector head for a current collector comprising an electrically conductive contact shoe and an electrically insulating contact shoe holder, which is produced with the method as set forth above. The electrically insulating contact shoe holder can preferably consist of a thermoplastic.

BRIEF DESCRIPTION OF THE DRAWINGS

An embodiment example of the disclosed method and current collector head are described below with reference to the drawings.

DETAILED DESCRIPTION

Figure 1:
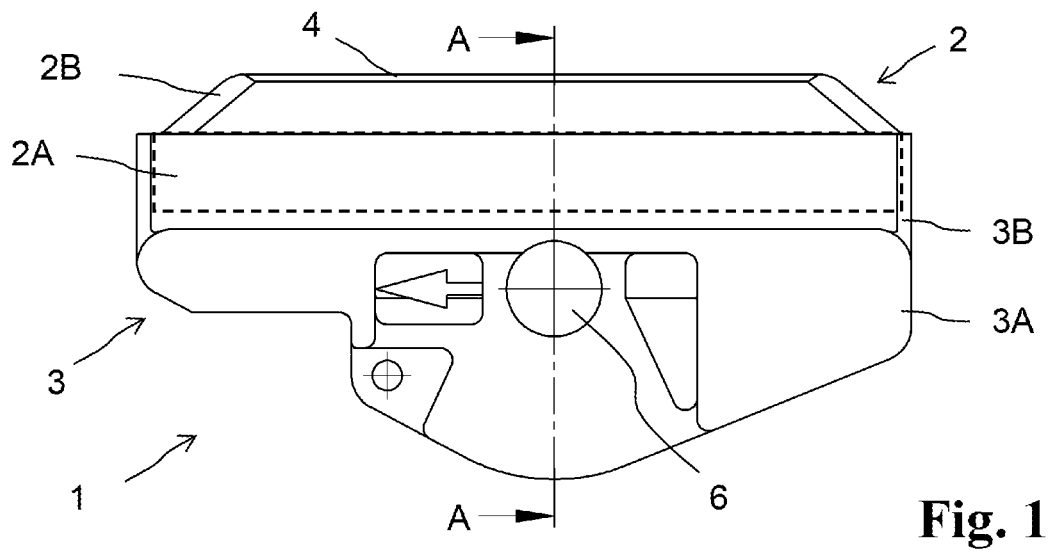
FIG. 1 shows a side view of a current collector head product according to the disclosure.
Figure 2:
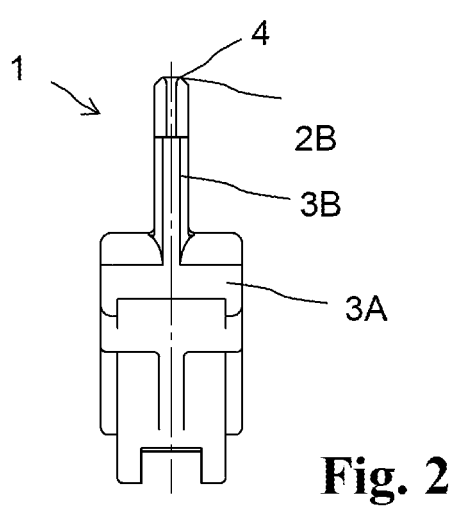
FIG. 2 shows a front view of the current collector head of FIG. 1.

FIGS. 1 and 2 show a current collector head 1 produced according to the invention, consisting of an electrically conducting contact shoe 2 and an electrically insulating contact shoe holder 3. The top 4 of the contact shoe 2 is intended to slide along a contact wire during operation on a live rail. A lower section 2A of the contact shoe 2, indicated by the dashed lines in FIG. 1, is accommodated in the contact shoe holder 3 in a groove 5 formed on its top, which is apparent in the sectional view of FIG. 3. The contact shoe holder 3 in the front view has a narrow upper section 3B and a significantly wider lower section 3A, where the locations "bottom" and "top" only refer to the depiction in FIGS. 1 to 3 and not to the spatial orientation of the current collector head 1 during operation on the current collector of a conductor rail system.

An upper section 2B of contact shoe 2 protrudes upwardly from the upper section 3B of the contact shoe holder 3. The current collector head 1 during operation on a current collector of a vehicle, which is supplied current through a contact line, is fastened by means of a pin extending through-hole 6 in the lower section 3A of the contact shoe holder 3 so that it can rotate around the center axis of hole 6 by a predetermined angle. The movement direction of current collector head 1 along the live rail of a contact line during operation corresponds to the direction of the arrow visible at the left next to through-hole 6 in FIG. 1 or the direction opposite thereto.

The groove 5 is wide enough in cross section that the lower section 2A of the contact shoe 2 can be introduced to it from above and is situated in opposite longitudinal sides of the groove 5 in contact with the longitudinal sides of the lower section 2A of the contact shoe 2. At one location, the base of groove 5 has an opening extending to the bottom of contact shoe holder 3, through which a plug connector formed on contact shoe 2, which is suitable for connection of the cable, extends in the direction of the bottom of contact shoe holder 3. This plug connector is not visible in the figures and is insignificant to the invention.

Figure 3:
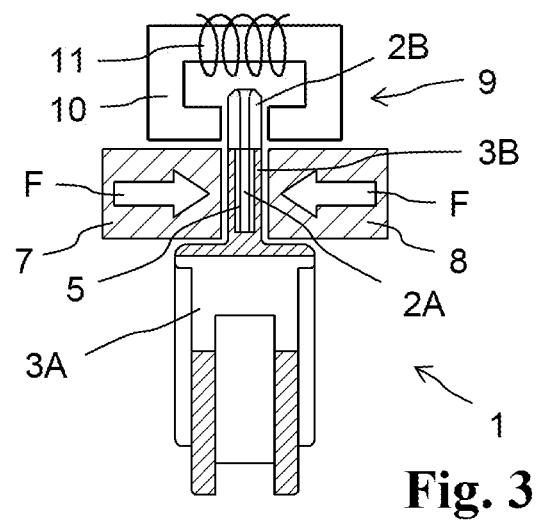
FIG. 3 shows a sectional view of the current collector head of FIG. 1 along line B-B with clamping jaws and induction coils and FIG. 4 shows a top view of the current collector head of FIG. 1 with clamping jaws and induction coils and FIG. 5 shows a sectional view of the current collector head of FIG. 1 along line B-B with clamping jaws and heating jaws.
Figure 4:
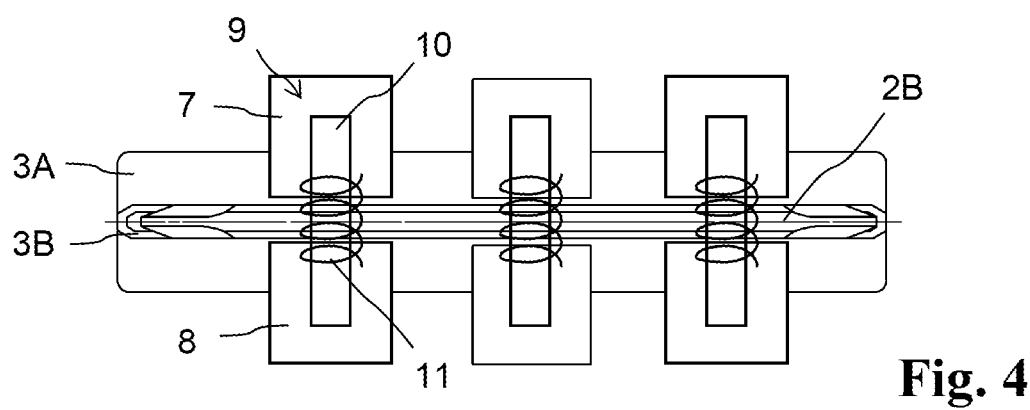

In order to fasten the contact shoe 2 to the contact shoe holder 3, according to the depiction in FIGS. 3 and 4, after introduction of the lower section 2A of the contact shoe 2 into groove 5 in the upper section 3B of the contact shoe holder 3, lateral clamping forces F are exerted by means of several opposite clamping jaws 7 and 8 in an opposite direction on the upper section 3B of the contact shoe holder 3 in the direction of the lower section 2A of the contact shoe, so that the longitudinal sides of groove 5 are forced against the longitudinal sides of the lower section 2A of the contact shoe 2 and the contact shoe 2 is fixed in this manner in the contact shoe holder 3.

An arrangement of inductors 9 is then positioned in the embodiment of the invention shown in FIGS. 3 and 4 in the form of a combination of a magnetic core 10 of ferromagnetic material with a coil 11 on the upper section 2B of the contact shoe 2, so that the alternating magnetic fields generated by coils 11 when coils 11 are supplied an alternating current penetrate the upper section 2B of the contact shoe 2. The magnetic cores 10 in the embodiment example depicted in FIGS. 3 and 4 are largely closed C-shaped cores with an air gap that is somewhat wider than the upper section 2B of the contact shoe 2, so that it fits into the air gap in the lateral direction and a spacing still remains on both sides between the contact shoe 2 and magnetic core 10. The inductors are thus brought close to the contact shoe 2, so that the magnetic cores 10 enclose its upper section 2B.

The initial heating of the upper section 2B of the contact shoe 2 occurs by means of the electrical eddy currents generated by the alternating magnetic fields in the conducting contact shoe 2, which propagates quickly as a result of the high thermal conductivity of the contact shoe 2 into its lower section 2A, especially in the areas directly beneath the magnetic cores 10. The magnitude of the current and duration of the energization of coils 11 is chosen so that, by means of heating, a softening of the upper section 3B of the contact shoe holder 3, which consists of thermoplastic, occurs on the longitudinal sides of the groove 5, and a bonded connection is formed between the surfaces of the contact shoe holder 3 and the contact shoe 2 forced together by the clamping jaws F. After the end of energization of coils 11, cooling occurs, followed by solidification of the formed connection between the contact shoe 2 and the contact shoe holder 3. It is expedient here that the clamping force is maintained for a time sufficient for said solidification after the end of energization.

In the depicted embodiment example according to FIG. 4, three inductors 9 are equidistantly arranged along the upper section 2B of the contact shoe 2 and three pairs of clamping jaws 7 and 8 along the upper section 3B of the contact shoe holder 3, so that one inductor 9 and one clamping jaw pair 7, 8 each are found at the same position with reference to the common longitudinal direction of the contact shoe 2 and the contact shoe holder 3. The clamping forces F are thereby introduced into the contact area between the contact shoe 2 and the contact shoe holder 3 that lies closest to the area of introduction of the thermal power into contact shoe 2.

The number of three inductors 9 and three clamping jaws pairs 7, 8 shown in FIG. 3 is merely an example. In principle, one inductor 9 and one clamping jaw pair 7, 8 would also be sufficient in order to bring about bonding of the contact shoe 2 to the contact shoe holder 3 at a location, but more than the number of three inductors 9 and three clamping jaw pairs 7, 8 shown in FIG. 4 could also be used. One larger clamping jaw pair 7, 8 and one larger inductor 9, which each extend along a significant part of the length of the contact shoe 2 and the contact shoe holder 3, could also be used.

The C-shape of the inductor 9 is an expedient shape, but is in no way the only possible shape. The spatial orientation of the current collector head 1, the clamping jaw 7, 8 and the inductor 9 during the thermal joining process need not correspond to the arrangement according to FIG. 3, but the entire arrangement, for example, could also be rotated 180°. In this case, the inductor 9 could be configured so that it has a housing that functions as a base, on which the components of the current collector head 1 to be joined together are initially placed in the assembled state and through which they are held in a defined position before they are fixed together by means of clamping jaws 7, 8.

Figure 5:
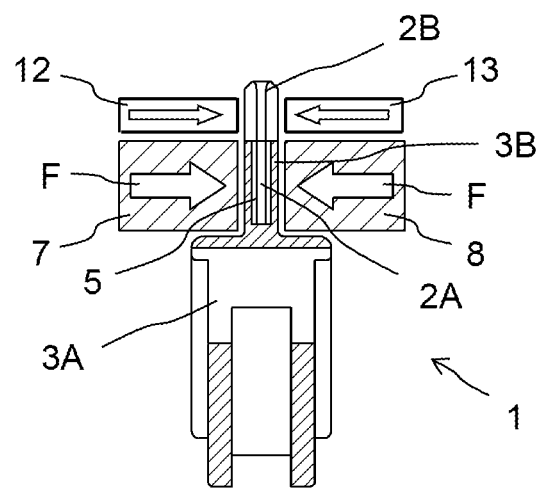

Another embodiment of the invention is shown in FIG. 5 with reference to a view of a current collector head as in FIG. 3. Components coinciding with FIG. 3 are marked in FIG. 5 with the same reference numerals as in FIG. 3. The only difference relative to the arrangement of FIG. 3 is that an additional clamping jaw pair 12, 13 is provided instead of the inductors 9 there for heating of the contact shoe 2, which functions in this embodiment as heat source for heating of contact shoe 2. For this purpose, the additional clamping jaw pair 12, 13 is initially heated to a predetermined temperature and then brought in contact with the upper section 2B of the contact shoe 2 by a movement in the direction marked by arrows in FIG. 5 and forced against it, so that the contact shoe 2 is heated starting from the areas of the surface of the upper section 2B situated in contact with the additional clamping jaw pair 12, 13.

Just as with the inductive heating in the first embodiment, heat here propagates vertically downward into the lower section 2A of the contact element 2. By exposing the upper section 3B of the contact shoe holder 3 to a clamping force F directed against the lower section 2A of the contact shoe 2 through the first clamping jaw pair 7, 8, as in the first embodiment, a bonding connection is produced between the upper section 3B of the contract strip holder 3 and the lower section 2A of the contact shoe 2. The difference relative to the first embodiment therefore only consists of a different origin of the heating of the contact shoe 2.

Just as in the first embodiment, heating of the upper section 2B can also occur in the second embodiment both point-like at one or more sites along the contact shoe 2 or extensively along the entire length of contact shoe 2. This can be achieved by a corresponding arrangement and shaping of one or more heated additional clamping jaw pairs 12, 13, similar to the arrangement of one or more inductors 9 in the first embodiment. Heating of the clamping jaw pair 12, 13 or additional clamping jaw pairs 12, 13 can occur, for example, electrically by means of heating wires embedded in the additional clamping jaws 12 and 13, as are used in the heating plates of electric stoves. Further conceivable types of heating of the additional clamping jaws 12 and 13 would be corresponding channels in the additional clamping jaws 12 and 13 through which a heated liquid is passed, or targeted irradiation of the additional clamping jaws 12 and 13 by an infrared radiation source.

In the embodiment examples, two clamping jaws 7 and 8 are provided on opposing sides of the upper section 3B of the contact shoe holder 3, each of which exerts an identical force F, i.e., a total of two forces in opposite directions on the upper section 3B and fastens the lower section 2A of the contact shoe 2 inserted in them, which is a preferred solution of clamping. In principle, however, only one force F could also be exerted by a single movable clamping jaw 7 or 8 from one side on the upper section 3B of the contact shoe holder 3, and thus forced against an unmovable holder on its other side.

LIST OF REFERENCE NUMERALS

1 Current collector head
2 Electrically conductive contact shoe
2A Lower section of contact shoe
2B Upper section of contact shoe
3 Electrically insulating contact shoe holder
3A Lower section of contact shoe holder
3B Upper section of contact shoe holder
4 Top of contact shoe
5 Groove
6 Hole
7 Clamping jaw
8 Clamping jaw
9 Inductors 10 Magnetic core
11 Coil
F Clamping forces

The invention claimed is:

1. A method for manufacturing a current collector head for a current collector having an electrically conductive contact shoe and an electrically insulating contact shoe holder, the method comprising:
   first, inserting a section of the contact shoe into an outwardly open cavity in the contact shoe holder configured and dimensioned to match the section of the contact shoe;
   second, clamping the contact shoe in the cavity of the contact shoe holder by acting on the contact shoe holder with at least an external force directed onto the inserted section of the contact shoe;
   third, with the section of the contact shoe inserted into the cavity of the contact shoe holder, heating the contact shoe to a temperature sufficient to form a bonded connection with the contact shoe holder;
   fourth, cooling the current collector head formed from the contact shoe and the contact shoe holder.

2. The method of claim 1, wherein the action of the external force after completion of heating is maintained for a predetermined time sufficient for permanent stabilization of the bonded connection.

3. The method of claim 1, wherein heating of the contact shoe occurs inductively by an alternating magnetic field.

4. The method of claim 1, wherein heating of the contact shoe occurs by mechanical contact with at least one heated body.

5. The method of claim 1, wherein the cavity in the contact shoe holder has a form of a groove with two parallel longitudinal sides, the length of which is a multiple of a spacing between the sides, and wherein a main direction of the external force lies perpendicular to the longitudinal sides of the groove.

6. The method of claim 5, wherein action of the external force on the contact shoe holder directed onto the contact shoe occurs on one or several individual sites along the groove of the contact shoe holder.

7. The method of claim 6, wherein both the action of the external force on the contact shoe holder directed onto the contact shoe, as well as the heating of the contact shoe on an identical site or several identical individual sites occur relative to the longitudinal direction of groove of the contact shoe holder.

8. The method of claim 5, wherein action of the external force on the contact shoe holder directed onto the contact shoe occurs extensively along the entire groove of the contact shoe holder.

9. The method of claim 5, wherein heating of the contact shoe occurs on a section of the contact shoe protruding from the groove in the contact shoe holder.

10. The method of claim 5, wherein heating of the contact shoe occurs on one or several individual sites along the groove of the contact shoe holder.

11. The method of claim 10, wherein both the action of the external force on the contact shoe holder directed onto the contact shoe, as well as the heating of the contact shoe on an identical site or several identical individual sites occur relative to the longitudinal direction of groove of the contact shoe holder.

12. The method of claim 5, wherein heating of the contact shoe occurs extensively along the entire groove of the contact shoe holder.

13. The method of claim 1, wherein the contact shoe is heated to a temperature sufficient to form a bonded connection between the surfaces of the contact shoe holder pressed together by the clamping force and the contact shoe.

14. The method of claim 1, wherein the electrically insulating contact shoe holder includes a thermoplastic.

* * * * *